United States Patent [19]

Fandrich

[11] Patent Number: 4,488,396
[45] Date of Patent: Dec. 18, 1984

[54] ROTARY CONE HARVESTER

[76] Inventor: Helmut E. Fandrich, 2461 Sunnyside Pl., Clearbrook, British Columbia, Canada, V2T 4C4

[21] Appl. No.: 398,094

[22] Filed: Jul. 14, 1982

[51] Int. Cl.³ ............................................. A01D 46/24
[52] U.S. Cl. .................................. 56/328 R; 56/130; 56/330
[58] Field of Search ...................... 56/328 R, 130, 330

[56] References Cited

U.S. PATENT DOCUMENTS

| | | | |
|---|---|---|---|
| 2,641,888 | 6/1953 | Grether | 56/130 |
| 2,938,325 | 5/1960 | Chase | 56/130 |
| 3,190,062 | 6/1965 | Paulson et al. | 56/130 |
| 3,255,578 | 6/1966 | Pertics | 56/330 |
| 3,968,631 | 7/1976 | Haines | 56/328 R |
| 4,077,193 | 3/1978 | Diggs | 56/328 R |

FOREIGN PATENT DOCUMENTS

| | | | |
|---|---|---|---|
| 1084277 | 8/1980 | Canada | 56/328 R |
| 873955 | 10/1981 | U.S.S.R. | 56/328 R |

Primary Examiner—Jay N. Eskovitz
Attorney, Agent, or Firm—Carver & Co

[57] ABSTRACT

An apparatus for harvesting seed cones from a tree has a lower guide portion with an opening for freely embracing the trunk of the tree while permitting vertical movement of the apparatus with respect to the tree. There is an upper cone receiving portion having a rotatable cone remover with a plurality of outwardly extending members for separating cones from the tree. Preferably, the cone remover has a roll portion. The outwardly extending members extend generally radially from the roll portion and are resilient and wire-like.

9 Claims, 7 Drawing Figures

ROTARY CONE HARVESTER

BACKGROUND OF THE INVENTION

This invention relates to an apparatus for harvesting seed cones which includes a rotatable cone remover.

The requirement for more efficient means for collecting seed cones from coniferous trees has become greater with increasing reforestation efforts. In the past, trees were frequently felled, or at least topped, in order to harvest the seed cones which typically grow at the top or crown of the tree. Such manual methods are slow and unproductive, so apparatuses have been developed to harvest cones from trees using helicopters. An example of such an apparatus is shown in Canadian Pat. No. 1,084,277 to Chilson.

Typical cone harvesters require that the helicopter pull cutters or strippers up the tree to cut or break the branches or strip the cones. The resulting shock loading on the helicopter is quite severe, especially since the helicopter is hovering under maximum or near maximum torque during the cone picking operation. Another disadvantage of such cone harvesters arises because the branches are separated from the tree. This means that a large portion of the payload of the helicopter is made up largely of unwanted branches. Moreover, removing the branches from the trees leaves the trees more vulnerable to disease or insect attacks. Tree growth may be stunted, especially if the tree top is removed.

Rotary harvesters have been developed in the past. For example, U.S. Pat. No. 2,482,355 to McBride discloses a nut collecter which uses a rotating brush having a plurality of flexible tines extending therefrom. An ejector mechanism is mounted eccentrically relative to the drum, the ejector mechanism having a cage-like structure which moves nuts held between the tines.

A grain pick-up attachment is shown in the U.S. Pat. No. 3,055,162 to Phillips. Radially extending brushes are raked by stripper fingers and an eccentric floating guide supports rings to brace the brushes.

U.S. Pat. No. 3,590,566 to Cutts discloses a berry harvester which includes a shaker assembly comprising rotatable and laterally oscilating fingers for engaging successive bushes. U.S. Pat. No. 3,616,630 to Gray discribes a machine for harvesting fruit on low plants which includes a brush.

These earlier devices do not, however, reveal an apparatus capable of efficiently harvesting seed cones from the tops of trees without removing a significant proportion of branches and which does not result in heavy shock loading on the helicopter.

SUMMARY OF THE INVENTION

According to the invention, an apparatus for harvesting seed cones from a tree comprises a lower guide portion having an opening for freely embracing the trunk of the tree and permitting vertical movement of the apparatus with respect to the tree. An upper cone retrieving portion has a rotatable cone remover with a plurality of outwardly extending members for separating cones from the tree.

Preferably, the cone remover is rotatable about an axis of rotation which is generally horizontal when the apparatus is positioned for use. The apparatus further comprises means for rotating the cone remover in a first rotational direction where the outwardly extending members facing the trunk move upwardly to assist the apparatus in moving downwardly about the tree, and in a second rotational direction opposite the first direction where the outwardly extending members facing the trunk move downwardly to assist the apparatus in moving upwardly about the tree.

In one preferred form, there are two of the rotatable cone removers on opposite sides of the tree embracing opening. The cone removers are contra-rotatable by the means for rotating.

In another form, the cone remover is rotatable about an axis of rotation which is horizontal when the apparatus is in use and is mounted on the ends of elongate arms hingedly connected to the upper portion of the apparatus to permit swinging of the cone remover towards the tree or away from the tree. There may be a second cone remover positioned to be on a side of a tree opposite that of the arm mounted cone remover and being rotatable about an axis of rotation which is parallel to the axis of rotation of the arm mounted cone remover. Advantageously, there are third and fourth cone removers rotatable about axes of rotation perpendicular to the axes of rotation of the arm mounted cone remover and the second cone remover. The second, third and fourth cone removers are in a U-shaped arrangement bordering an opening for the tree. The arm-mounted cone remover is swingable towards or away from the second cone remover between the third and fourth removers.

When compared with earlier apparatuses for harvesting cones, the present invention offers significant advantages. For example, the rotating members or tines separate cones from the tree with only a small proportion of branches. By mounting the tines resiliently, they will yield rather than break off larger branches. Moreover, providing means for contra-rotating the cone removers means that the action of the tines can help in raising or lowering the apparatus relative to a tree, consequently reducing shock loading on the helicopter. The efficiency of the operation is significantly increased because of the increased proportion of cones when compared with branches. This means that each load contains many more cones. Furthermore, additional time is saved on the ground because it is no longer necessary to remove most of the cones from the branches. There is less damage done to the tree since large branches and tree tops are not removed.

The apparatus can be used on any size of cones and one form of the invention is particularly suited for trees with broad crowns.

BRIEF DESCRIPTION OF THE DRAWINGS

FIG. 1 is a side elevational view of the apparatus suspended about a tree by a helicopter, the apparatus being partly broken away;

FIG. 2 is a fragmentary perspective view of the upper cone retrieving portion of the apparatus of FIG. 1;

DESCRIPTION OF THE PREFERRED EMBODIMENTS

Figures 1, 2:
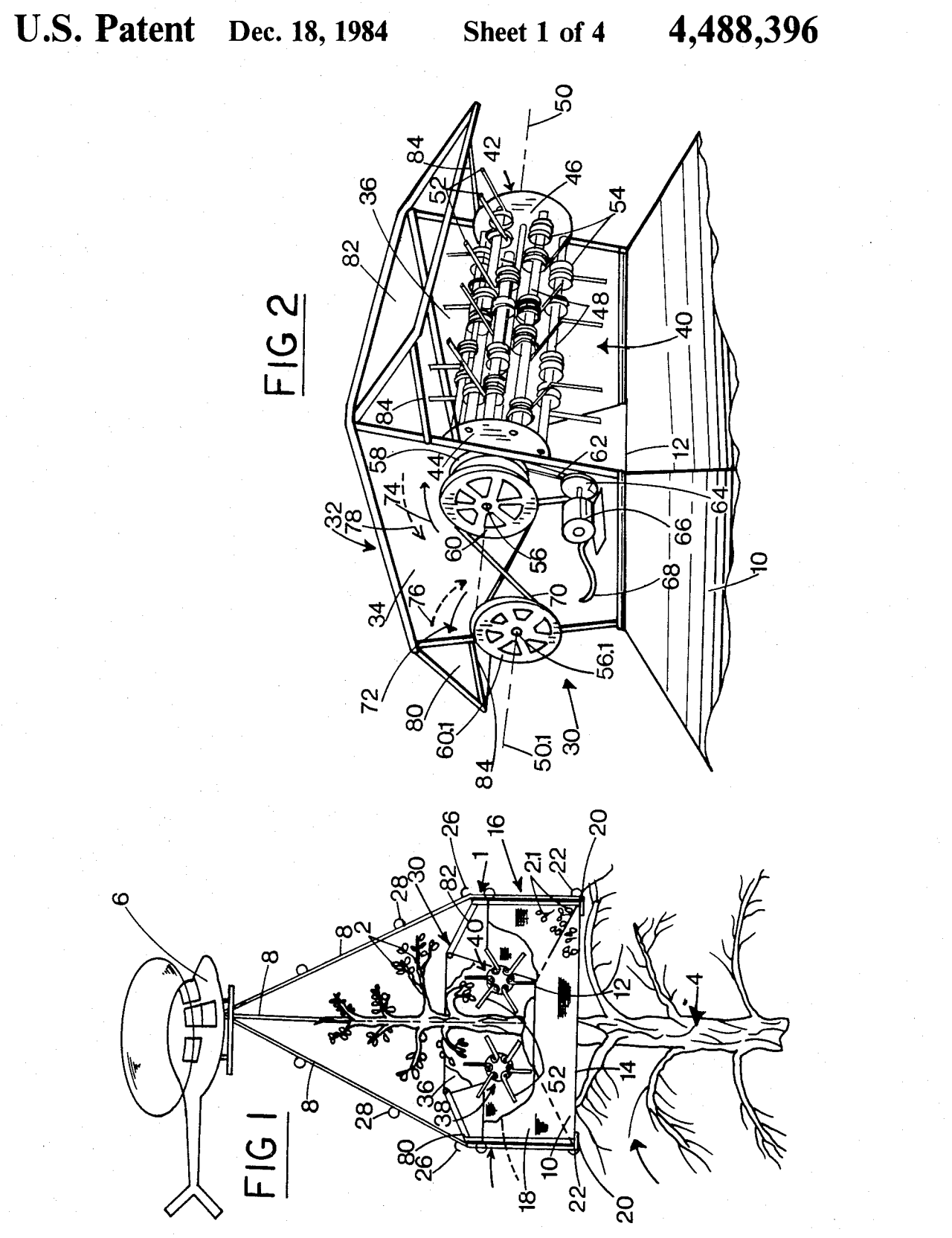
Figure 3:
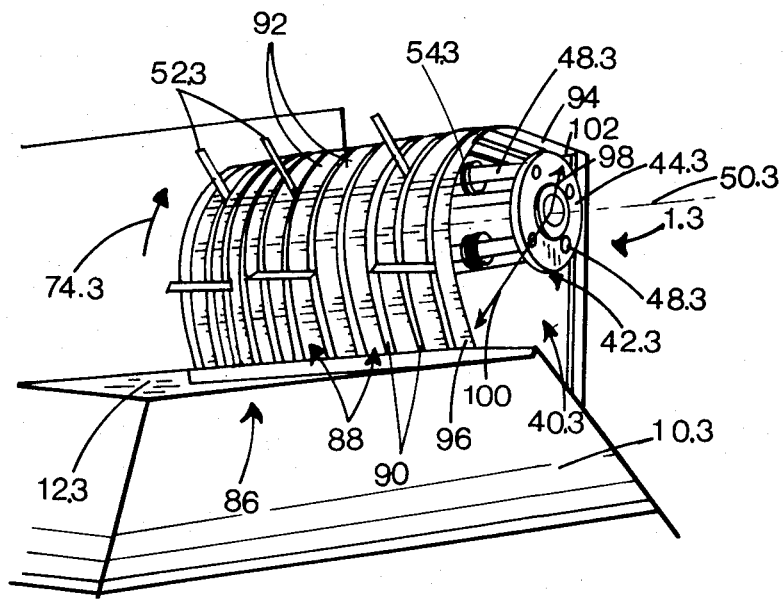
FIG. 3 is a fragmentary perspective view of an upper cone retrieving portion of a second embodiment of the invention.

Referring to FIG. 1, an apparatus 1 is shown for harvesting seed cones 2 from a tree 4. The apparatus 1 is adapted to be suspended from a helicopter 6 my means of cables 8 which serve as a harness. Three cables 8 are preferred to keep the apparatus level. The apparatus is shown embracing the upper part or crown of the tree where most of the seed cones are located on a coniferous tree.

The apparatus has a lower guide portion 10 which is in the shape of a truncated, hollow cone or pyramid. Glass fibre reinforced plastic is used for lower guide portion 10 in the preferred embodiment, although alternative materials such as sheet metal or wire mesh could be used. The guide portion has an opening 12 at the top thereof which embraces the tree 4. From the top opening 12, the guide portion enlarges downwardly to a larger opening 14 at the bottom thereof.

The apparatus 1 has a retaining means 16 for retaining cones separated from the tree. The retaining means comprises a cage in the preferred embodiment of wire-mesh or the like with sides 18 which extend upwardly from the bottom of the guide portion 10 when the apparatus is positioned for use as shown in FIG. 1. The retaining means 16 normally rests on the projections 20 at the outer periphery of guide portion 10 near anchors 22 which hold the bottom ends of cables 8. Hooks are connected to the top of the retaining means adjacent each of the cables 8. The retaining means can therefore be raised by lowering the helicopter to slacken cables 8, engaging eyelets 28 on the cables with hooks 26, and then moving the helicopter upwards. This raises the retaining means relative to the lower guide portion.

The shape of the retaining means depends upon the shape of the guide portion 10. If the guide portion is conical, the retaining means is cylindrical. The retaining means has three sides if the guide portion is a triangular pyramid, four sides if the guide portion is a four-sided pyramid, or the number of sides required to suit any other number of sides of the guide portion.

The apparatus 1 also includes an upper cone retrieving portion 30 which is mounted on the top of the cone or pymaid comprising the lower guide portion 10. The upper portion includes a hopper 32 with two vertical sides 34 and 36 on each side of the opening 12 of the lower portion as shown in FIG. 2. Side 36 is shown partly broken away in FIG. 1.

The sides 34 and 36 provides support for a pair of contra-rotatable cone removers 38 and 40. The cone removers are identical and the details of cone remover 40 are shown in FIG. 2. Each cone remover includes a roll portion 42 with discs 44 and 46 at opposite ends thereof. A plurality of rods 48 extend between the discs parallel to axis of rotation 50. Each of cone removers 38 and 40 has a plurality of outwardly extending members 52 which serve to separate cones 2 from the tree 4 during rotation of the roll portions 42. As may be seen in FIG. 2, each member 52 extends generally radially with respect to axis 50. Each member 52 is resilient and wire-like and is preferably made from a spring steel. Each member 52 has a coil 54 formed about one of the rods 48 to form springs. The coils permit considerable deflection of the members 52 when they encounter branches during rotation of the cone removers.

As shown in FIG. 2, cone remover 40 is rotatable about the axis 50 which is horizontal when the apparatus is positioned for use, while cone remover 38 is rotatable about a parallel axis 50.1. Cone remover 40 has a central drive shaft 56, while cone remover 38 has a similar drive shaft 56.1. A pair of drive pulleys 58 and 60 are mounted on shaft 56, while a drive pulley 60.1 is mounted on shaft 56.1. A V-belt 62 connects pulley 58 to a smaller pulley 64 on an electric motor 66. A cord 68 supplies motor 66 with power from the helicopter 6. A crossed V-belt 70 connects pulleys 60 and 60.1. Accordingly, it may be seen that, when motor 66 rotates in the clockwise direction from the point of view of FIG. 2, pulleys 60.1 and 60, together with cone removers 38 and 40 are contra-rotated in the directions indicated by the solid arrows 72 and 74 in FIG. 2. It may be appreciated with reference to FIG. 1 that the outwardly extending members 52 facing the trunk of tree 4 move upwardly. Similarly, when motor 66 is rotated in the counterclockwise direction, the cone removers are contra-rotated in the directions 76 and 78 so the members facing the trunk of the tree move downwardly. Motor 66 may be, for example, a direct current motor and the direction of rotation can be determined by the polarity of the current supplied to cord 68 by the helicopter. It should be understood that other means could be provided for rotating the cone removers. For example, a hydraulic motor could be provided which receives pressurized fluid from the helicopter. Otherwise, the apparatus could be self-powered with an internal combustion engine coupled to pulley 64.

As shown in FIGS. 1 and 2, deflectors 80 and 82 are mounted on the upper cone retrieving portion 30 above the cone removers 38 and 40, respectively. As seen, each deflector comprises a flat, rectangular member which is inclined downwardly towards the lower guide portion 10. These deflectors serve to deflect cones separated from the tree by the cone removers downwardly onto the lower guide portion. The deflectors are strengthened by a plurality of braces 84 connected to the vertical sides 34 and 36.

A slightly different embodiment of the invention is illustrated in FIG. 3 where the same reference numbers are used for equivalent parts with the additional designation ".3". Only a portion of apparatus 1.3 is illustrated including lower guide portion 10.3, which is in the shape of a hollow, four-sided pyramid, and one of the cone removers 40.3. The cone remover 40.3 is generally similar to the cone remover 40 shown in FIG. 2, although is has a fewer number of rods 48.3. Disc 44.3 at one end of the rods is illustrated. The cone remover 40.3 is rotatable about axis of rotation 50.3. It has a plurality of outwardly extending members 52.3 similar to those in FIG. 2, each having a coil 54.3.

The main distinction between the embodiments of FIG. 2 and FIG. 3, is the cage-like structure 86 comprising a plurality of spacers 88. The members or tines 52.3 are rotatable through slots 90 which separate the spacers 88. In the illustrated embodiment, there is only one tine 52.3 for each of the slots 90. Each of the spacers 88 has a curved portion 92 which generally faces a tree located within opening 12.3 of the lower guide portion 10.3. As shown, each of the curved portions 92 has the shape of a partial-circular segment a constant distance from axis of rotation 50.3 of the cone remover 40.3. As illustrated, the tines are fully extended beyond the spacers 88 when located between the curved portions 92.

Each of the spacers 88 has two outer portions 94 and 96 connected to the top and bottom of its curved portions 92, respectively. In the illustrated embodiment, the outer portions 94 and 96 are straight and are formed from the same piece of material as the curved portion 92. The outer portions extend outwardly with respect to axis of rotation 50.3 as indicated by arrows 98 and 100. Because of this, the tines 52.3 rotate outwardly from behind the spacers when approaching the curved portions 92 and rotate inwardly behind the spacers past the curved portion. For example, when cone remover 40.3 is rotating in the clockwise direction indicated by arrow 74.3 in FIG. 3, the tines gradually extend outwardly from the spacers as they rotate through slots 90 between outer portions 96. Once past the curved portions 92, the tines gradually move inwardly with respect to the spacers 88 until they are completely behind outer portions 94 at the back ends 102 thereof.

Figure 4:
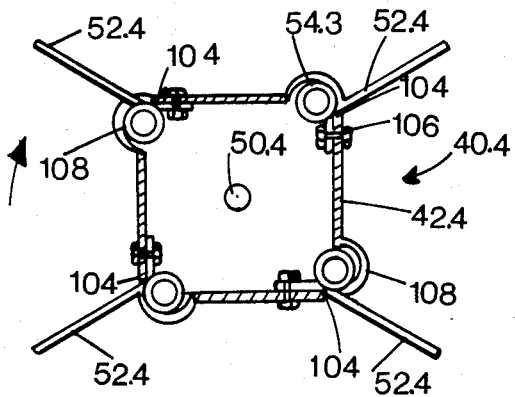
FIG. 4 is a side view showing the rotatable cone remover of a third embodiment of the invention in section.

FIG. 4 illustrates an alternative cone remover 40.4 wherein like parts have the same numbers in FIG. 2 with the additional designation ".4". This cone remover has a roll portion 42.4 which is square in section, having four corners 104. Cone remover 40.4 is rotatable about an axis of rotation 50.4 and has a plurality of outwardly extending tines 52.4 at each corner thereof. The tines are similar to those of the other embodiments, having a coil 53.4 adjacent the roll portion. A bolt 106 connects the inner end of each of the tines to the roll portion. The resiliency of the coils 54.3 allows deflection of the tines within slots 108 formed in the roll portion.

Figure 5:
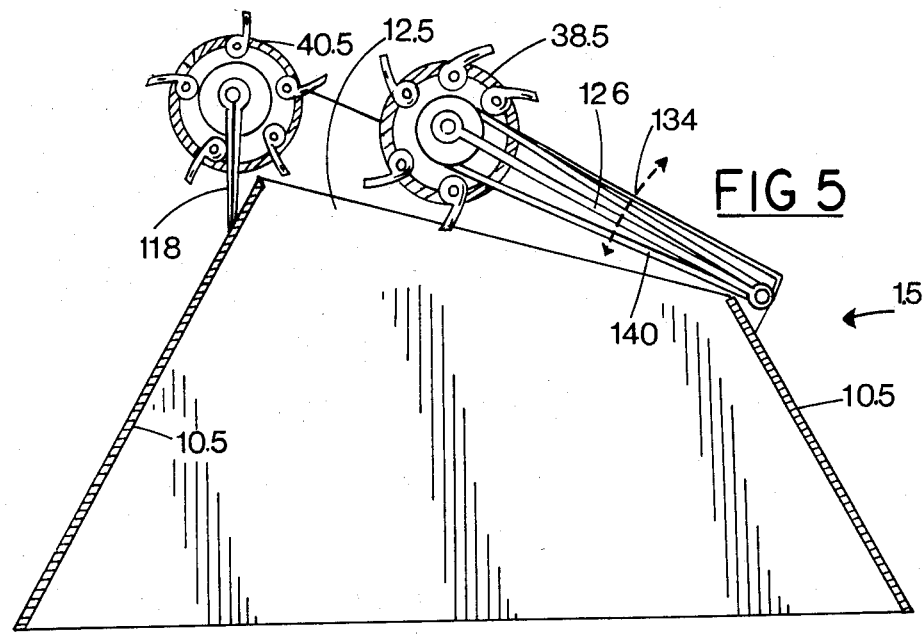
FIG. 5 is a fragmentary side view showing the lower guide portion and rotatable cone removers of a fourth embodiment of the invention in section.
Figure 6:
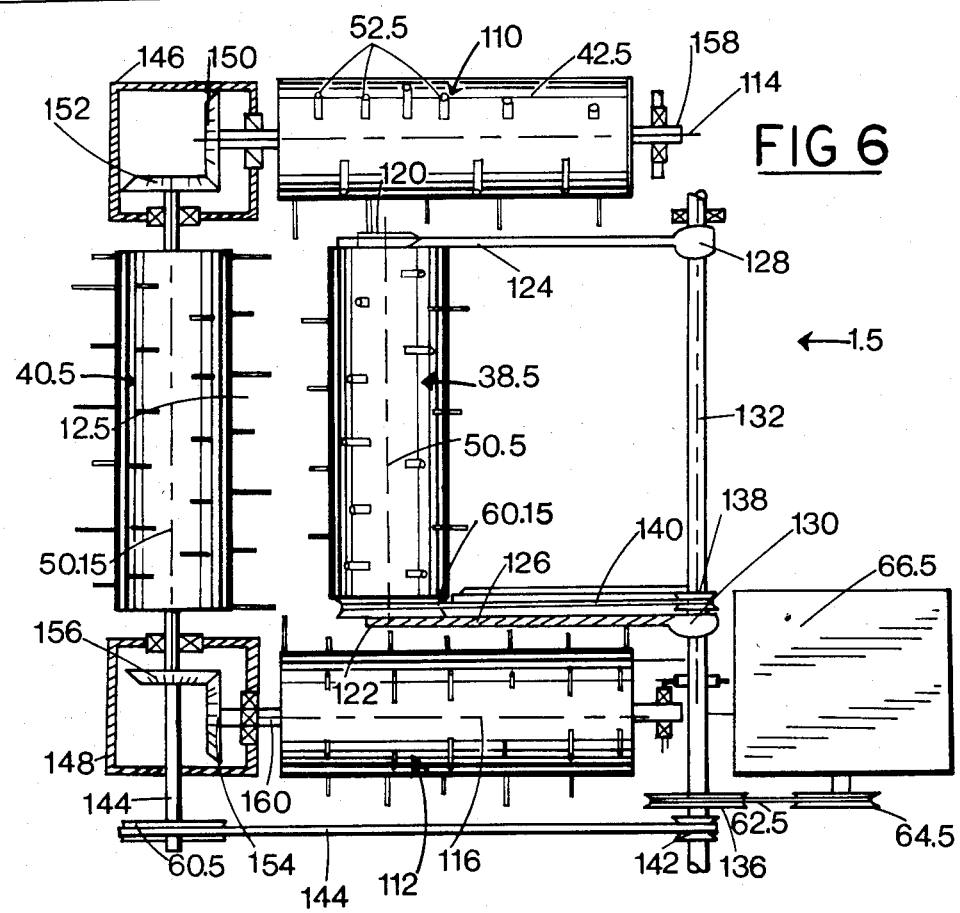
FIG. 6 is a fragmentary top plan view, partly in section and partly diagrammatic, showing the rotatable cone removers of the embodiment of FIG. 5.

A further embodiment of the invention is illustrated in FIGS. 5 and 6 where like parts have the same numbers with the additional designation ".5". In this embodiment there are four cone removers 38.5, 40.5, 110 and 112, referred to as the first, second, third and fourth cone removers, respectively. Each of the cone removers is generally similar to those of the other embodiments, having a roll portion 42.5 and a plurality of outwardly extending members or tines 52.5. The cone removers 38.5, 40.5, 110 and 112 are rotatable about horizontal axes of rotation 50.5, 50.15, 114 and 116, respectively. Axes 50.5 and 50.15 are parallel, while axes 114 and 116 are perpendicular to the other two axes. It may be seen the cone removers 40.5, 110 and 112 are in a U-shaped arrangement bordering the opening 12.5 in the lower guide portion 10.5 which receives the tree. These three cone removers are rotatably mounted on the top of the lower guide portion 10.5 for rotation about their respective axes.

The first cone remover 38.5, also referred to as the arm-mounted cone remover, is rotatably mounted on the outer ends 120 and 122 of a pair of elongate arms 124 and 126. The arms 124 and 126 have bearings 128 and 130, respectively, which rotatably receive a drive shaft 132. Shaft 132 and bearings 128 and 130 comprise a hinged connection between arms 124 and 126 and the lower portion 10.5 of the apparatus.

In use, the tree is positioned within opening 12.5 of the lower guide portion 10.5 with cone removers 38.5 and 40.5 on opposite sides of the tree. It may be appreciated that arms 124 and 126 permit swinging of cone remover 38.5 towards the tree or away from the tree. Cone removers 40.5, 110 and 112 border the opening 12.5 for the tree, while the arm-mounted cone remover 38.5 is swingable towards or away from the second cone remover 40.5 between the third and fourth cone removers. The swinging motion of cone remover 38.5 and the arms 124 and 126 is indicated by the arrows 134 of FIG. 5.

Power for this embodiment is provided by a motor or engine 66.5 provided with an output pulley 64.5. Pulley 64.5 is connected by a V-belt 62.5 to pulley 136 connected to shaft 132 and which rotates the shaft. Another pulley 138 on shaft 132 is connected to pulley 60.15 of cone remover 38.5 by a cogged timing belt 140. Alternatively, a chain and sprockets could be used. Thus, the motor or engine 66.5 rotates cone remover 38.5. A third pulley 142 on shaft 132 is connected to pulley 60.5 on shaft 144 by a crossed V-belt 144. Due to the crossed V-belt, shaft 144 contra-rotates cone remover 40.5 with respect to cone remover 38.5.

Gear boxes 146 and 148 are located at opposite ends of cone remover 40.5. Gear box 146 has a pair of bevel gears 150 and 152, while gear box 148 has a corresponding set of bevel gears 154 and 156. Bevel gears 152 and 156 are mounted on shaft 144 and mesh with gears 150 and 154 on shafts 158 and 160 of cone removers 110 and 112, respectively. With the power train just described, it may be seen that the tines 52.5 of all four cone removers which face a tree within opening 12.5 move upwardly or downwardly at the same time depending upon the direction of rotation of motor 66.5.

Figure 7:
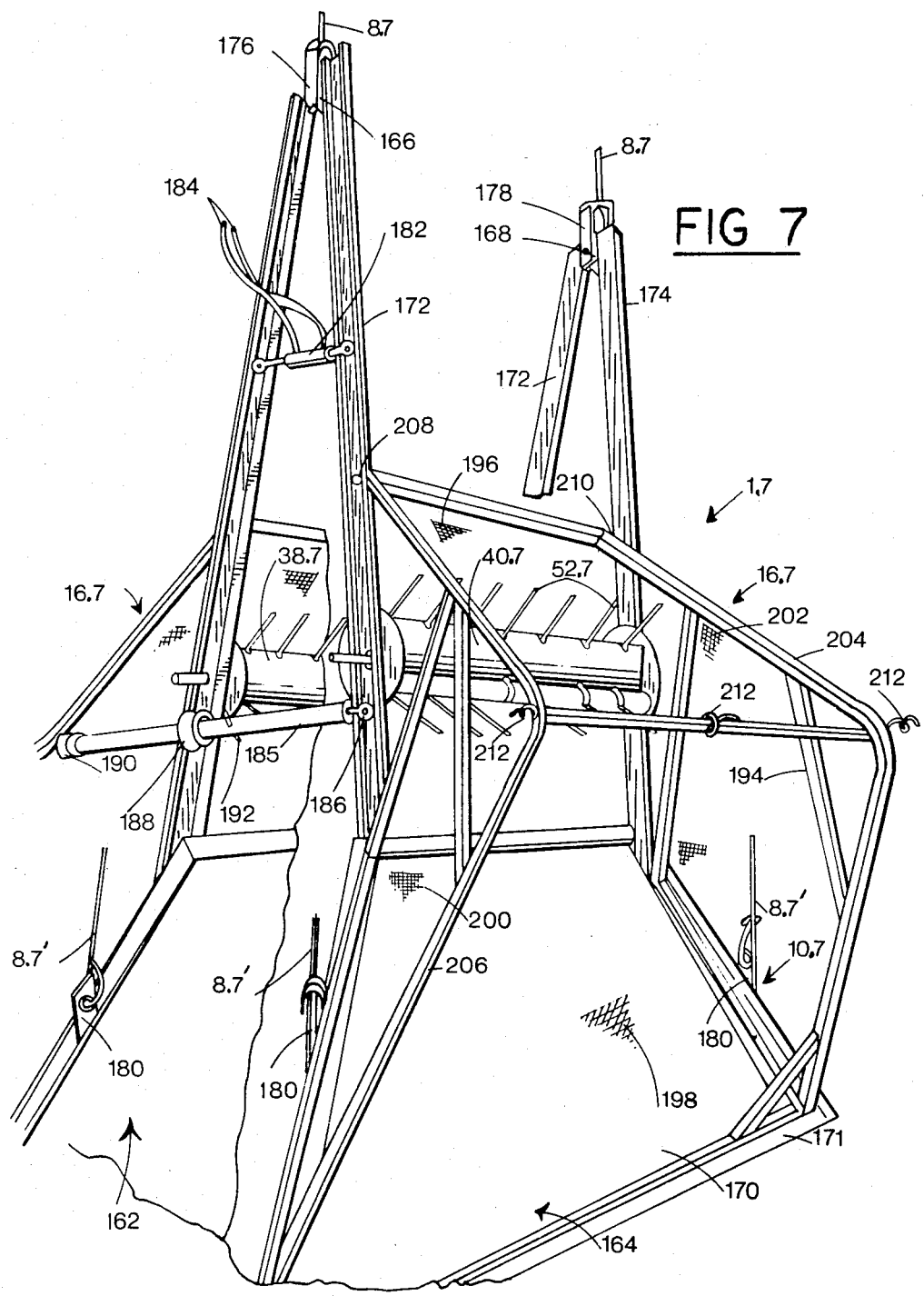
FIG. 7 is a perspective view, partly broken away, of a cone remover according to a fifth embodiment of the invention.

A fifth embodiment of the invention is illustrated in FIG. 7. Apparatus 1.7 features an adjustable lower guide portion 10.7 consisting of two parts 162 and 164 hingedly connected at 166 and 168. In this way, apparatus 1.7 can open in a clamshell like manner which is particularly suited for broad-topped trees such as yellow spruce. As shown for part 164, each of the parts of lower guide portion 10.7 includes a trapezoidal-shaped inclined surface 170 which may be of a solid material, such as sheet metal or fiberglass, or may comprise a screen. The surface 170 is surrounded by a perimeter frame 171 which may be suitably made of aluminum. A pair of upright members 172 and 174 connect the parts of the lower guide portion to the hinged connections 166 and 168 respectively on clevice members 176 and 178. A pair of cables 8.7 are used to suspend apparatus 1.7 from the helicopter. Alternatively, apertured members 180 could be provided on the frames 171 so the apparatus may be suspended from the helicopter by four cables 8.7'.

The movement of parts 162 and 164 of the lower guide portion towards or away from each other is caused by a hydraulic cylinder 182 which is powered and controlled by hydraulic lines 184 leading to the helicopter. Alternatively, a pneumatic cylinder, an electromagnet or an electric motor could be used for the same purpose. A horizontal rod 185 is connected to the upright member 172 extending from part 164 by a pivotal connection 186. The rod passes slidably through a ring 188 connected to the corresponding upright extending from part 162 of the lower guide portion. An annular stop member 190 is formed on the end of the rod opposite pivotal connection 186. A pin 192 between the ring and the pivotal connection forms another stop member.

Rotatable cone members 38.7 and 40.7 are mounted between the upright members 172 and 174. These cone pickers are contra-rotated by motors not illustrated in this embodiment. Each of the rotatable cone pickers has a plurality of outwardly extending members or tines 52.7.

A cone retaining means 16.7 is provided for cone remover 40.7 which extends down to inclined surface 170 of part 164 of the lower guide portion. A similar retaining means is provided for cone remover 38.7 and part 162. Each of the retaining means 16.7 comprises a cage-like structure including a frame with a top surface 196, a bottom surface 198 and two sides 200 and 202 all covered with wire mesh. For clarity in the drawings, only small patches of the wire mesh are illustrated.

The frame 194 includes a pair of spaced-apart V-shaped members 204 and 206. The V-shaped members have top ends pivotally connected to uprights 172 and 174 by pin connections 208 and 210. A plurality of hooks 212 are connected to the frame 194.

OPERATION

The operation of apparatus 1 is best appreciated with reference to FIG. 1. The apparatus is flown above tree-top level by the helicopter 6 connected to the apparatus by the harness comprising the three cables 8. As mentioned above, most seed cones are found at the crown or top part of coniferous trees, so the apparatus is adapted to operate on this part only. Locating the apparatus properly on the top of the tree is made easy by the relatively large bottom opening 14 on the lower guide portion 10. The tapering sides of the pyramidal or conical shaped lower guide portion guides the tree top and branches towards the smaller top opening 12 as the apparatus is lowered over the tree by the helicopter. The downward movement is further facilitated if the cone removers 38 and 40 are contra-rotated in the directions indicated by the solid arrows 72 and 74 in FIG. 2. The members or tines 52 act against the branches of the tree to push the apparatus downwardly.

During the downward movement of the apparatus over the crown of the tree, the rotating tines contact many of the cones 2 and separate cones from the tree. The detached cones 2.1 fall downwardly to the top of the lower guide portion 10 and collect at its outer periphery as shown. The deflectors 80 and 82 prevent cones from being propelled over the top of the apparatus and being lost. Instead, the deflectors deflect the cones downwardly onto the top of the lower guide portion 10.

The downward movement of the apparatus is eventually impeded when it encounters limbs of the tree too large to pass through opening 12 even with the help of the contra-rotating cone removers or else it reaches a level below the crown of the tree which has the majority of the cones. When such a point is reached, the apparatus is lifted upwardly by increasing the altitude of the helicoper. The upward movement can again be facilitated by contra-rotating the cone removers in the opposite direction indicated by the broken arrows in FIG. 2. During the upward movement, additional cones are separated by the tines and deposited onto the top of the lower guide portion. The upward and downward movements may be repeated a few times to assure that a reasonable proportion of the cones are harvested.

During the cone harvesting operation, the tines of the cone removers will obviously encounter branches. However, the resilient deflection permitted by the coils 54 sets a limit on the maximum force which the cone removers can apply. The spring force of the coils is such that the cone removers can easily remove cones, but are deflected by branches. This means that the available space within the retaining means 16 and above lower guide portion 10 is filled largely with cones instead of branches.

The helicopter can move from tree to tree until the apparatus is fully loaded. After this, the helicopter carries the apparatus to a convenient location on the ground and lowers it until the apparatus contacts the ground and the cables 8 are slackened. Eyelets 28 are secured to hooks 26 of the cage-like retaining means 16. The helicopter then raises upwards to lift the retaining means away from lower guide portion 10 and allow the collected cones to slide outwardly off of the guide portion onto the ground. An electric winch controlled from the helicopter could be used alternatively. The cones then can be gathered and stored in a suitable location. After this the cables are slackened by moving the helicopter downwardly and the eyelets 28 are removed from hooks 26. The apparatus is again ready to collect another load of cones.

The apparatus shown in FIG. 2 has the advantage of simplicity, although the branches and the trunks of the trees can make direct contact with roll portion 42 of the cone removers and with the coils 54 of the members or tines 52. The possibility of this happening is removed when the apparatus 1.3 of FIG. 3 is used. The cage-like structure 86 comprising the plurality of spacers 88 prevents any contact between the roll portion 42.3 or coils 54.3 and the branches or trunk. Only the tines 52.3 can contact the branches or trunk and, as disclosed above, they would be deflected because of the coils 54.3. It should also be noted that for this embodiment the cone removers have a self-clearing action. Because each of the spacers 88 has outer portions 94 and 96 which extend outwardly with respect to axis of rotation 50.3, the tines move outwardly through slots 90 between spacers 88 only as they approach the curved portions 92 of the spacers. They are thereby covered until required for the cone separating operation. Moreover, after the tines pass curved portions 92 of the spacers, they again move inwardly behind the spacers, for example, outer portion 94 when they are rotating in the direction shown by arrow 74.3. When the tines move behind the spacers, the spacers push off any material, such as small branches or clusters of cones which are then free to fall onto the lower guide portion 10.3. A rotational speed of approximately 100 r.p.m. has been found to be satisfactory for the cone removers. During this rotation, the tines 52.3 rub against the spacers 88. This means that the tines for the embodiment of FIG. 3 tend to wear quicker than in arrangements without spacers as shown in FIG. 2.

The cone remover 40.4 illustrated by FIG. 4 is designed to minimize damage to the branches and tree trunks caused by these making contact with the rotating roll portion. Because the tines are located at corners 104, which are located at the furthest points outwardly from the axis of rotation 50.4, the possibility of branches or trunks contacting the flat sides of the roll portion 42.4 is minimized. These sides are essentially recessed relative to the positions of the tines at the corners.

Apparatus 1.5 of FIGS. 5 and 6 is designed to maximize the percentage of cones harvested by provided four rotating cone removers 38.5, 40.5, 110 and 112 which surround the tree embracing aperature 12.5. The cone separating operation is carried out completely around the tree instead of being attacked on two sides only as in the other embodiments. Moreover, because cone separator 38.5 is located on the elongate arms 124 and 126, the size of the opening between the cone separators can be adjusted. FIG. 6 illustrates the minimum size of the opening. In this case, contact with cone removers 38.5 and 40.5 is assured to remove cones even at the very top of the tree where the diameter is quite small. However, as the apparatus moves downwardly, arms 124 and 126 and cone remover 38.5 can swing upwardly to increase the size of the opening 12.5 when the tree gets larger.

Apparatus 1.7 of FIG. 7 is particularly suited for trees such as yellow spruce which have relatively broad tops. The opening for the tree comprises the space between parts 162 and 164 of the lower guide portion 10.7. Accordingly, the space for the tree can easily be adjusted by the action of hydraulic cylinder 182. It should be noted that the distance between cone removers 38.7 and 40.7 is adjusted at the same time because they are mounted on uprights 172 and 174. The cones removed by the cone removers are held above the inclined surfaces 170 on each side of the apparatus by the cage-like retaining means 16.7. The cones are unloaded by securing cables to hooks 212 and raising the retaining means about pin connections 208 and 210.

It may be appreciated that any number of rotatable cone removers may be utilized in various configurations. For example, three of them could be utilized when the lower guide portion is in the shape of a hollow, triangular pyramid. In this case, the retaining means would also be triangular.

It should also be noted that the apparatus could be used in combination with a crane instead of a helicopter.

With reference to the embodiment of FIG. 7, hydraulic cylinder 182 could be deleted since the movement of the cone removers over the branches opens the device.

What is claimed is:

1. An apparatus for harvesting seed cones from a tree, the apparatus comprising:
   (a) a lower guide portion having an opening for embracing the tree and permitting vertical movement of the apparatus with respect to the tree; and
   (b) an upper cone retrieving portion having a rotatable cone remover with a plurality of outwardly extending members for separating cones from the tree, the cone remover being rotatable about an axis of rotation which is generally horizontal when the apparatus is positioned for use, the apparatus further comprising means for rotating the cone remover in a first rotational direction where the outwardly extending members which face the trunk of the tree move upwardly to assist the apparatus in moving downwardly about the tree and, in a second rotational direction opposite the first direction where the outwardly extending members which face the tree move downwardly to assist the apparatus in moving upwardly about the tree.

2. An apparatus as claimed in claim 1, comprising two said rotatable cone removers on opposite sides of the tree embracing opening, the cone removers being contra-rotatable by the means for rotating.

3. An apparatus as claimed in claim 1, wherein the cone remover has a roll portion, the outwardly extending members comprising tines extending generally radially from the roll portion, the tines being resilient and wire-like.

4. An apparatus as claimed in claim 3, wherein the tines have inner ends connected to the roll portion which are coiled to form springs.

5. An apparatus as claimed in claim 3, further comprising spacers between the tines, the members being rotatable through slots between the spacers.

6. An apparatus as claimed in claim 5, wherein each of the spacers has a curved portion which faces the tree in use and where the tines are fully extended beyond said each of the spacers, and two outer portions connected to the curved portion which extend outwards with respect to the axis of rotation of the cone remover so the tines rotate outwardly from behind the spacers when approaching the curved portion and rotate inwardly behind the spacers past the curved portion.

7. An apparatus as claimed in claim 1, wherein the cone remover is mounted on the ends of elongate arms hingedly connected to the lower portion of the apparatus to permit swinging of the cone remover towards the tree or away from the tree, the apparatus further comprising a second said cone remover positioned to be on a side of the tree opposite that of the arm mounted cone remover and being rotatable about an axis of rotation which is parallel to the axis of rotation of the arm mounted cone remover, and third and fourth said cone removers rotatable about axes of rotation perpendicular to the axis of rotation of the arm mounted cone remover and the second cone remover, the second, third and fourth cone removers being in a U-shaped arrangement bordering an opening for the tree, the arm mounted cone remover being swingable towards or away from the second cone remover between the third and fourth cone removers.

8. An apparatus as claimed in claim 1, wherein the roll portion is generally square in section with four corners, the members being at the corners of the roll portion.

9. An apparatus as claimed in claim 1, wherein the lower guide portion has two spaced-apart parts, the opening for embracing the tree being between the parts.

* * * * *